UNITED STATES PATENT OFFICE.

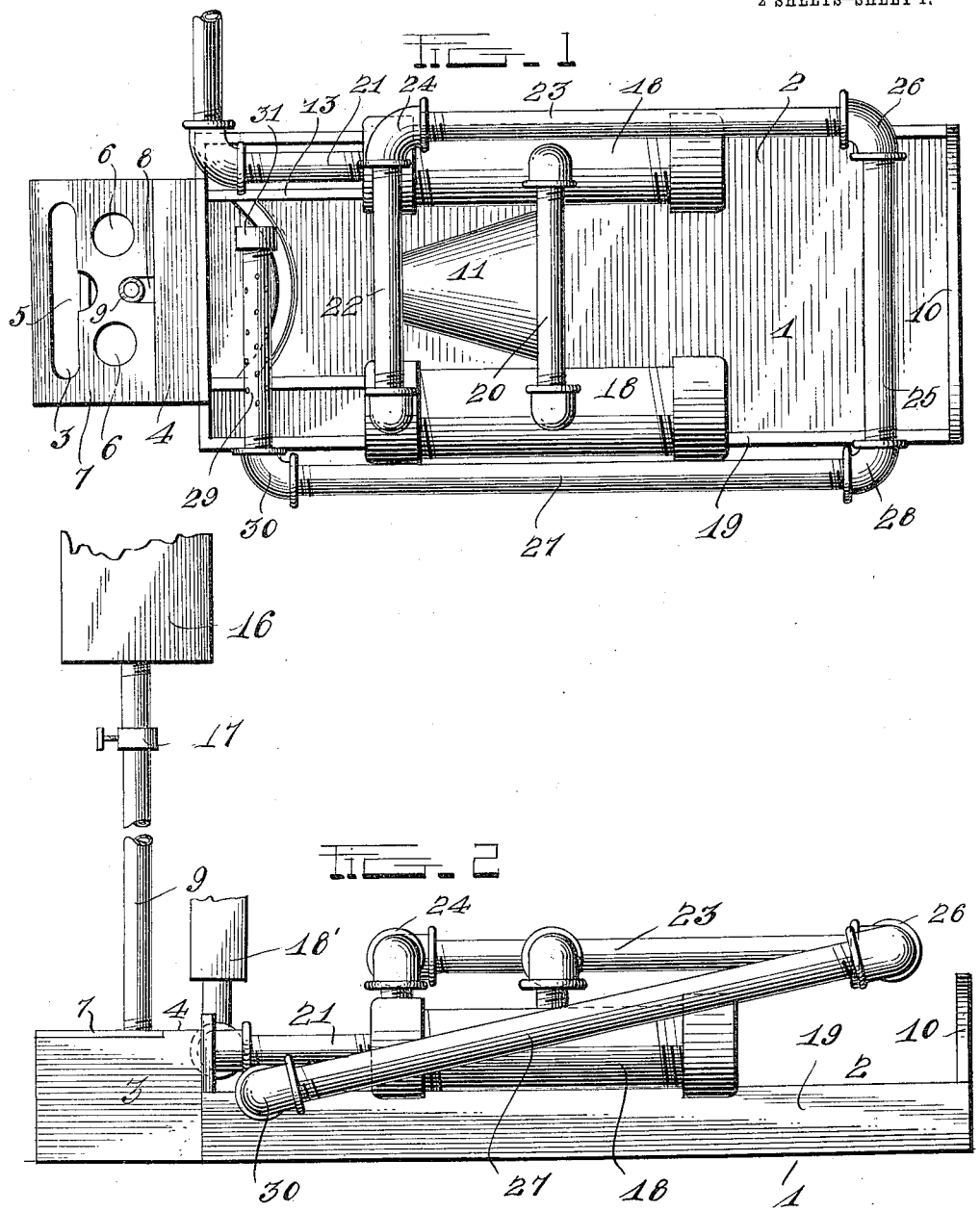

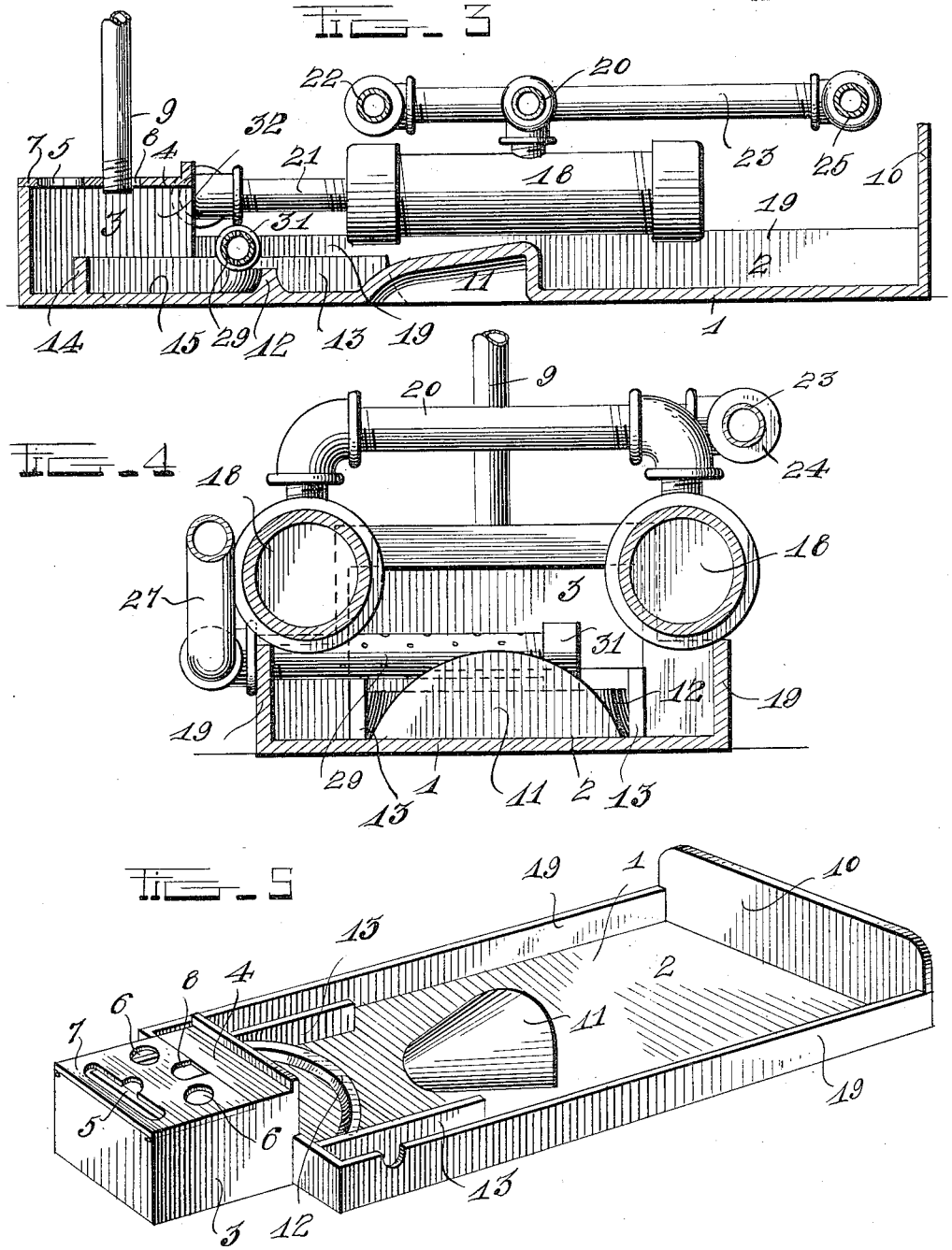

DANIEL A. CARDWELL, OF TOPEKA, KANSAS.

CRUDE-OIL BURNER.

1,069,851.           Specification of Letters Patent.      Patented Aug. 12, 1913.

Application filed April 6, 1912.   Serial No. 688,885.

*To all whom it may concern:*

Be it known that I, DANIEL A. CARDWELL, citizen of the United States, residing at Topeka, in the county of Shawnee and State of Kansas, have invented certain new and useful Improvements in Crude-Oil Burners, of which the following is a specification, reference being had therein to the accompanying drawing.

This invention relates to crude oil burners and has for its object the production of a burner which will eliminate all smoke and produce a good combustion in the fire pan.

Another object of this invention is the production of a burner which can be readily applied to any heating, or cooking stove or furnace, and which is simple in construction and consists of a comparatively small number of parts.

With these and other objects in view this invention consists of certain novel constructions, combinations, and arrangements of parts, as will be hereinafter more fully described and claimed.

In the drawings: Figure 1 is a top plan view of the oil burner. Fig. 2 is a side elevation thereof. Fig. 3 is a central longitudinal section of the oil burner. Fig. 4 is a central transverse section thereof. Fig. 5 is a detail perspective of the burner pan.

Referring to the drawings by numerals 1 designates the burner pan which comprises a burning compartment 2 and a mixing compartment 3. This mixing compartment 3 is slightly narrower than the burner compartment 2 and is provided with a closed upper end 4. This upper end 4 is provided with an elongated aperture 5, and a plurality of smaller apertures 6 for allowing a draft to pass through the mixing compartment 3. The mixing compartment is provided with a cover 7 in which is formed the apertures 5 and 6, and this cover is also provided with a notched portion 8 adapted to fit around the oil feed pipe 9. Owing to the construction of the notch or socket 8, the cover 7 may be readily removed from the mixing compartment 3. The burner compartment is provided at its opposite end with an upwardly extending deflector flange 10 for preventing the flame from going too far beyond the end of the burner compartment 2. The compartment is also provided centrally thereof with a spreading or deflector portion 11, which deflector portion 11 constitutes an upwardly extending conical shaped partition as illustrated clearly in Fig. 3. A semi-circular web 12 is formed integral upon the pan 1 and constitutes a separating wall between the mixing compartment and the burner compartment. The flange 12 merges into a pair of parallel flanges 13 carried by the burner compartment 2, and a flange 14 is also formed upon the pan 2, thereby constituting a pocket 15 for catching the drip of the oil from the oil supply pipe 9. This oil supply pipe 9 may be connected to an oil reservoir 16 as illustrated in Fig. 2, and, of course, may be provided with the usual valve control means 17 for controlling the supply of oil to the drip pan 15.

A pair of boilers 18 are carried by the side flanges 19 of the burner compartment 2, and are held in spaced relation by means of a transversely extending connecting pipe 20. This pipe 20 is connected centrally of the boiler 18 and is so placed as to have the flame within the burner compartment 2 readily engage the transversely extending pipe 20 as well as the boilers 18. One of the boilers 18 is directly connected to a water supply tank 18' by means of a line of pipe 21 which may be of any desired style. One end of the opposite boiler 18 is connected to a transversely extending pipe 22 which pipe is connected to a longitudinally extending pipe 23 by means of an elbow 24. This pipe 23 extends above the boiler 18 and is connected to a transversely extending pipe 25 by means of an elbow 26. This transversely extending pipe 25 extends across the outer end of the burner compartment 2 and is connected to the burner extending pipe 27 by means of an elbow 28. This pipe 27 is connected to a perforated steam discharge pipe 29 by means of an elbow 30 and the outer end of the steam discharge pipe 29 is closed by means of a cap 31.

The mixing compartment 3 is provided with an open end 32 and when the burner is first lighted the oil drips from the supply pipe 9 into the pocket 15, and as soon as sufficient oil has been deposited, the same is ignited through the aperture 5, or one of the apertures 6, and the draft caused through the apertures 5 and 6 will drive the flame outwardly and cause the flame to flare outwardly and come in engagement with the boilers 18 and pipes connected therewith. As this continues the water in the boilers 18 will be changed into steam and as the steam passes through the several pipes the same will be still further heated, and when it finally reaches the discharge pipe 29 the steam will be greatly heated and by mixing the steam with the burning oil, a very good combustion will be produced, and by means of the draft which is caused through the apertures 5 and 6 the flame from the combined mixture of oil and steam will be driven outwardly against the deflector 11. The flame will then spread out under the boilers 18 and act upon the pipe 20 and the several pipes connected up to the boilers as above described. It will therefore be seen that the steam so discharged will atomize the oil to such an extent as to form a very effective combustion and thereby eliminate the soot or other corrosive matter which is likely to collect upon the burner wherein crude oil is used.

From the foregoing description it will be obvious that a very efficient and durable burner has been produced and that by the arrangement of the particular burner pan, the flame will be so well distributed throughout its entire length to at all times act effectively upon the boilers and pipes connected thereto so as to form a good atomizer for the oil and produce an efficient combustion.

What is claimed is:—

1. A burner of the class described comprising a burner compartment, and a mixing compartment, said mixing compartment provided with a removable top having a plurality of draft apertures placed therein, a flange formed integrally upon said burner compartment and constituting one wall for an oil receiving pocket, a flange carried within said mixing compartment and constituting another wall for said oil receiving pocket, a deflector member carried by said pan, a boiler positioned upon each side of said deflector member, a pipe connected to said boiler, a steam discharge pipe connected to said first-mentioned pipe and positioned above said oil receiving pocket and adapted to discharge steam therefrom for causing a good combustion, and said deflector member being adapted to cause flame from said oil receiving pocket and steam discharge nozzle to pass under said boilers.

2. A burner of the class described comprising a burning compartment and a mixing compartment, said burning compartment provided with a conical-shaped deflector, an oil receiving pocket carried by said mixing compartment, a boiler carried upon each side of said burning compartment and placed above the same and upon each side of said deflector, a connecting pipe extending transversely of said burning compartment and engaging said boilers, and a line of pipe connected to one of said boilers and extending transversely of said burning compartment near its inner end, continuing longitudinally thereof and extending transversely of said burning compartment near its outer end, continuing inwardly of said burning compartment and carrying a steam discharge pipe at its inner end for causing an efficient combustion and mixture with oil delivered from said mixing compartment.

In testimony whereof I hereunto affix my signature in presence of two witnesses.

DANIEL A. CARDWELL.

Witnesses:
CHAS. MONTGOMERY,
R. D. WALLACE.

Copies of this patent may be obtained for five cents each, by addressing the "Commissioner of Patents, Washington, D. C."